United States Patent
Sola et al.

(10) Patent No.: US 6,178,389 B1
(45) Date of Patent: Jan. 23, 2001

(54) METHOD OF DETERMINING THE MEASURING UNCERTAINTY OF A COORDINATE MEASURING DEVICE

(75) Inventors: Domenico Sola, Rivalta; Emanuele Ricci, Cascine Vica; Alessandro Balsamo, Turin; Mauro Di Ciommo, Turin; Bruno Ippolito Rebaglia, Turin, all of (IT)

(73) Assignees: Brown & Sharpe DEA SpA, Moncalieri; Consiglio Nazionale Delle Richerche, Rome, both of (IT)

(*) Notice: Under 35 U.S.C. 154(b), the term of this patent shall be extended for 0 days.

(21) Appl. No.: 09/167,981

(22) Filed: Oct. 8, 1998

(30) Foreign Application Priority Data

Oct. 9, 1997 (IT) .............................................. TO97A0895

(51) Int. Cl.[7] .......................... G01C 17/00; G01B 5/004; G01B 5/008
(52) U.S. Cl. .......................... 702/152; 702/167; 702/168; 33/503
(58) Field of Search .................................. 702/33, 35, 36, 702/81, 85, 86, 87, 88, 94, 97, 105, 113, 128, 127, 15, 150–153, 155, 138, 767; 33/503, 504, 553–55; 760/160–163; 703/1, 2, 7

(56) References Cited

U.S. PATENT DOCUMENTS 4,884,348 * 12/1989 Zeller et al. ........................... 33/502

* cited by examiner

*Primary Examiner*—Marc S. Hoff
*Assistant Examiner*—Manuel L. Barbee
(74) *Attorney, Agent, or Firm*—Hall, Priddy, Myers & Vande Sande

(57) ABSTRACT

To determine the measuring uncertainty of a coordinate measuring machine, a real measurement is first made of a workpiece, with any compensation provided for on the machine disabled, to obtain a measured value of one or more required quantities; a predetermined number of simulation cycles are then performed according to the Monte Carlo method to statistically vary a given number of influence parameters affecting the measurement and generate simulated values of the required quantity; and the measuring uncertainty value is determined by statistically analyzing the deviations between the simulated values and the measured value.

8 Claims, 3 Drawing Sheets

METHOD OF DETERMINING THE MEASURING UNCERTAINTY OF A COORDINATE MEASURING DEVICE

BACKGROUND OF THE INVENTION

The present invention relates to a method of determining the measuring uncertainty of a coordinate measuring machine.

Coordinate measuring machines—hereinafter referred to simply as CMMs—are machines for checking the dimensions of parts of all shapes, and are of enormous assistance in computer-aided production techniques (from CAD/CAM to CIM) of numerically controlled machining centers.

CMMs operate on the principle of sampling the surface of a part and, by means of a tracer movable along three perpendicular Cartesian axes, acquiring a predetermined number of surface points by which to reconstruct the shape of the part by means of an interpolation algorithm.

By virtue of their high degree of measuring precision, CMMs are used to advantage for checking machining tolerances, as opposed to less accurate conventional measuring instruments, but supply a numeric result, with no indication as to the uncertainty, of the measurement.

This therefore poses the problem of determining the uncertainty of CMM measurements to determine the measurand values defining the ambiguous regions, i.e. the regions in which it is difficult to establish whether or not the part conforms to specifications. The ambiguous regions, in fact, define both sides of the tolerance region, i.e. the range defined by the minimum and maximum values the measured quantity may assume to be considered valid. If the measurement lies in an ambiguous region, the part is normally considered outside the tolerance range and rejected, hence the obvious advantages of reducing the ambiguous regions by reducing the uncertainty of the measurement.

ISO 9000 quality standards require that the measuring uncertainty of test and measuring equipment be known and compatible with measuring requirements.

SUMMARY OF THE INVENTION

It is an object of the present invention to provide a method of rapidly and accurately determining the uncertainty of a CMM measurement, and which is repeatable for any type of measurement.

According to the present invention, there is provided a method of determining the measuring uncertainty of a coordinate measuring machine, as claimed in claim 1.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
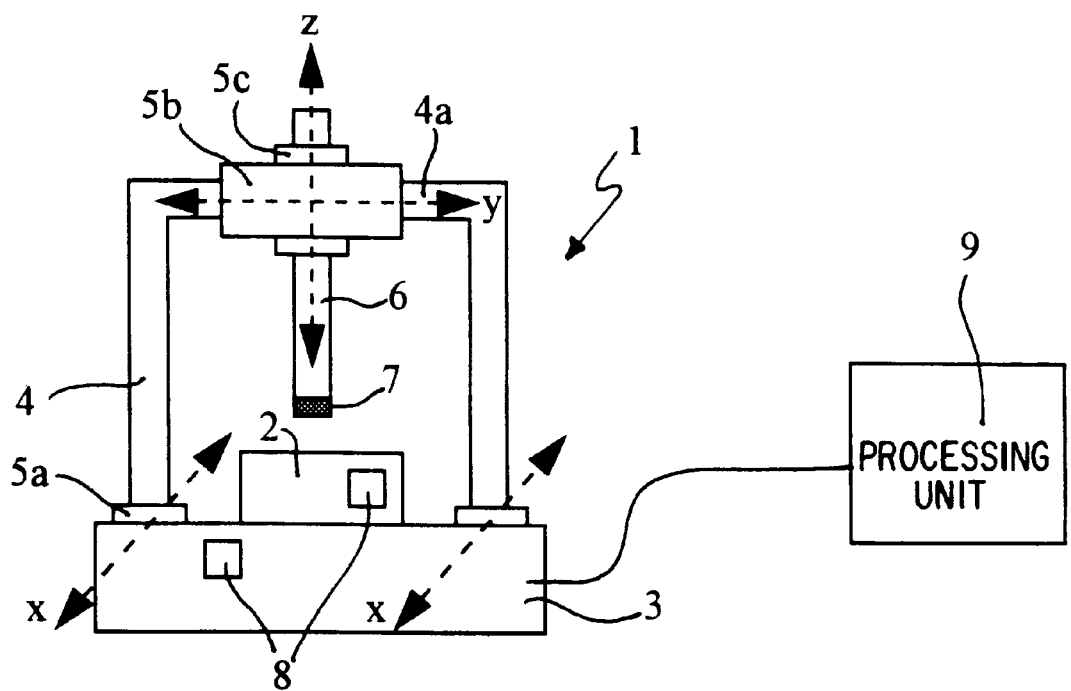
FIG. 1 shows a schematic view of a CMM to which the measuring method according to the invention is applied.

Number 1 in FIG. 1 indicates a known CMM for measuring dimensions, e.g. machining tolerances, of a part 2 produced, for example, by an on-line numerically controlled machine tool. The dimensions measured may comprise one or more quantities of part 2; and, when measuring more than one quantity (e.g. the diameters and center distance of two parallel holes), these may be either related or unrelated.

CMM 1 substantially comprises a bed 3 to which part 2 is secured (e.g. bracketed); a gantry support 4 fitted at the bottom with a first carriage 5a movable along bed 3 in a straight horizontal first direction (x); and a rod 6 carried by a second carriage 5b movable, with respect to the crosspiece 4a of gantry support 4, in a horizontal second direction (y) perpendicular to the first. Rod 6 is fitted with a third carriage 5c movable, with respect to second carriage 5b, in a vertical third direction (z) perpendicular to the first (x) and second (y) directions, and is fitted at the bottom with a tracer element 7 for sampling and picking up points on the surface of part 2.

CMM 1 also comprises actuators (not shown) for moving carriages 5a, 5b, 5c in their respective directions (x, y, z); and sensors (not shown) for determining the position of tracer element 7 in the three directions (x, y, z).

CMM 1 comprises a known programmable electronic unit (not shown) for controlling the movement of tracer element 7 according to the type of measurement selected and on the basis of user-supplied information about part 2, and is connected to a processing unit 9 defining an interface by which measuring parameters are entered by the user.

CMM 1 is provided with sensors 8 for determining variations in environment parameters, such as temperature and possibly also pressure, humidity, etc., and comprises known graduated scales (not shown) for relating the values measured by tracer 7 to dimensioned values. More specifically, the graduated scales comprise graduated ceramic rules extending alongside and in the traveling directions of the carriages; and each carriage 5a, 5b, 5c comprises an optical reader (not shown) for reading the position of the moving carriage on the respective graduated rule.

The method according to the present invention provides for determining the uncertainty of a measurement by a CMM of the type described above. When measuring only one quantity, determining the uncertainty of a measurement is equivalent to calculating the variance of the quantity, the variance value being equal to the square of the uncertainty value. When measuring more than one quantity, on the other hand, determining the uncertainty of a measurement is equivalent to determining the uncertainty of each quantity, as well as the degree to which the various quantities are related. Which means calculating for the set of measured quantities the variance-covariance matrix, which comprises the variance values of the single quantities along the main diagonal—each value being equal to the square of the uncertainty value of the respective quantity—and, in the remaining positions, the covariance values relating the quantities in pairs.

Figure 2:
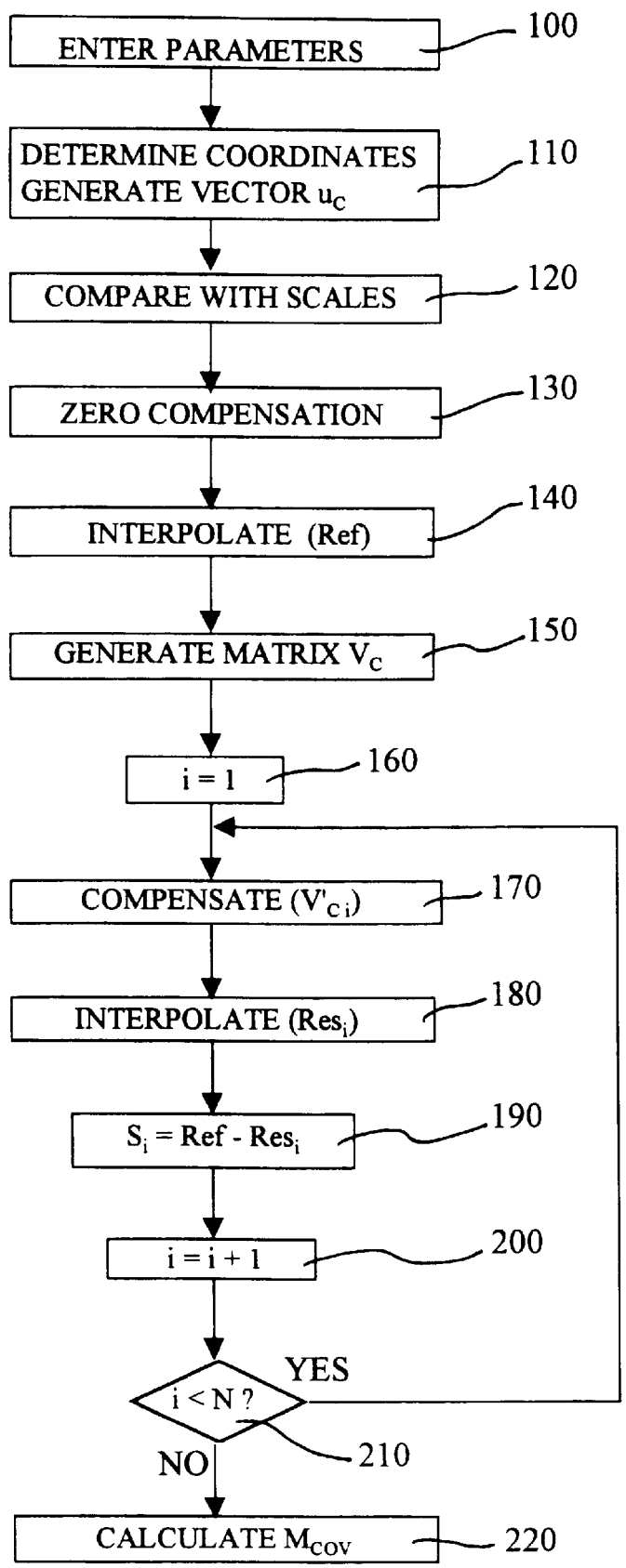
FIGS. 2–4 show flow charts of steps in the method according to the invention.

With reference to FIG. 2, the measuring uncertainty calculating method commences with a block 100, in which the user enters onto CMM 1 the part 2 surface sampling strategy, and the point interpolation algorithm to be used later.

In block 100, the user also enters onto processing unit 9 the values of any of various types of influence parameters which may affect calculation of the quantities concerned, and which may be formed into functional groups. For example, a first group comprises environment parameters, some of which are detected by sensors 8 and transmitted directly to processing unit 9, while others are entered onto processing unit 9 by the user. Sensor-detected parameters include temperature T and possibly also other pertinent physical quantities, such as pressure, humidity, etc. User-entered parameters include the pattern and range of variation in temperature T on part 2, on the machine bed, and on the graduated scales; the time intervals Δt between successive measurements by tracer 7 (which depend on machine speed and the shape of part 2); the thermal expansion coefficients α of part 2 and the graduated scales; and the coordinates of the restraints securing part 2 to bed 3. User-entered parameters are estimated values based on experience, the outcome of previous measurements, the values of the parameters measured by sensors 8, and probabilistic calculations, etc.

A second group of so-called "geometric" parameters comprises parameters describing the straightness and rotation (roll, pitch, yaw) of each carriage 5a, 5b, 5c of CMM 1; the offset of tracer 7, i.e. the distance between tracer 7 and a fixed reference point located, for example, on third carriage 5c (this distance is required to correct the value detected by tracer 7); the type of tracer 7 selected, etc.

Other groups may comprise parameters relative to load effects; tracer 7 errors (anisotropy of the transfer function); hysteresis and slack in the motion of carriages 5a, 5b, 5c of CMM 1; and dynamic errors caused by in-service vibration or stress of CMM 1, etc.

Some of the above effects may be partly or wholly compensated by a known compensating unit (not shown) featuring calculating modules and respective measuring instruments and methods provided by the maker, and which may be activated automatically or as requested by the user. The compensating unit provides, in particular, for eliminating systematic errors of CMM 1 determined on the basis of estimated values of some of the aforementioned influence parameters (environment, geometric, etc.) or on the basis of environment values detected by sensors located on CMM 1 and either defined by or of a different type from sensors 8.

Some influence parameters must be entered before each measurement, whereas others may be entered beforehand and remain unchanged for any type of measurement (for example, the offset values of different types of tracers used on the machine; the thermal expansion coefficients of the graduated scales; geometric identification parameters, etc.). As each of the entered or measured parameters, however, is affected by uncertainty, the variation range and the probability distribution of each must be known to execute the method according to the invention.

Block 100 is followed by a block 110, in which, by means of tracer 7, CMM 1 determines the coordinates ($x_{P1}$, $y_{P1}$, $z_{P1}$; . . . ; $x_{Pk}$, $y_{Pk}$, $z_{Pk}$) of a predetermined number of points (P1, . . . , Pk) on the surface of part 2, from which to work out the required quantities $G_1$, . . . , $G_r$. The set of coordinates ($x_{P1}$, $y_{P1}$, $z_{P1}$; . . . ; $x_{Pk}$, $y_{Pk}$, $z_{Pk}$) may be assigned a coordinate vector $u_c$=[$x_{P1}$ $y_{P1}$ $z_{P1}$ . . . $x_{Pk}$ $y_{Pk}$ $z_{Pk}$] of dimension 3k.

Block 110 is followed by a block 120, in which the values of the coordinates ($x_{P1}$, $y_{P1}$, $z_{P1}$; . . . ; $x_{Pk}$, $y_{Pk}$, $z_{Pk}$) are referred to the graduated scales to convert the values into dimensioned values.

In the next block 130, any compensation (by said compensating unit) provided for by the maker is disabled.

In the next block 140, CMM 1, by means of known calculations on the coordinates ($x_{P1}$, $y_{P1}$, $z_{P1}$; . . . ; $x_{Pk}$, $y_{Pk}$, $z_{Pk}$), interpolates the acquired points to obtain a set of reference values Ref=($g_1$, . . . , $g_r$) of the required quantities $G_1$, . . . $G_r$.

The steps described hereinafter are those which characterize the present method, and which provide for calculating the measuring uncertainty of required quantities $G_1$, . . . , $G_r$. In particular, the next blocks 150–210 provide for performing a known statistical simulation technique known as the Monte Carlo method, and for performing a predetermined N number of processing cycles of the simulation results to obtain the end result of the present method in a final block 220.

Briefly, the Monte Carlo method provides for obtaining a probabilistic estimate of a y variable (e.g. m-dimensional) given the probabilistic description of an x variable (e.g. n-dimensional) to which the y variable is related by a function y=f(x). That is, the method briefly consists in generating at random, according to the known probabilistic description, a large number p of inputs x, which are applied as simulation variables to the y=f(x) model to obtain the same number of outputs y, and so obtain a sample of p observations of outputs y by which to calculate the required statistical parameters. As the result tends asymptotically towards the theoretical value as the p number of observations, i.e. the number of simulation cycles, is increased, a suitable number of cycles must be performed to obtain statistical parameters to an acceptable degree of approximation. The principal merit of the Monte Carlo method lies in making the complexities of the probabilistic analysis and the y=f(x) model independent of each other.

Assuming, as in this case, that function y=f(x) represents the mathematical model of a physical system, the inputs of which are known to uncertainty $\Psi_x$, the problem is one of calculating the uncertainty $\Psi_y$ of the outputs. And since the random nature of the inputs and outputs is due in this case to uncertainty, the problem is identical in formal terms to the one described previously, and may therefore be tackled using the Monte Carlo method. It should be stressed, however, that, for determining the value of output y, the y=f(x) equation only involves measured inputs, whereas, for determining uncertainty $\Psi_y$, model y=f(x) must contain all the influence parameters significantly affecting uncertainty, including those not measured and not compensated. The values of the latter are not known, but the probabilistic descriptions (uncertainties) must be. For example, in many CMMs, temperature is not measured and the effects of temperature are not compensated, so that variable T plays no part in determining the result. Not being of negligible effect, however, variable T must be included in the complete model to calculate uncertainty.

With reference to FIG. 2, block 150 first generates a matrix R, the generic i-th row of which is defined by the elements of a statistical-perturbation vector $r_i$=[$\epsilon_{xP1i}$ $\epsilon_{yP1i}$ $\epsilon_{zP1i}$ . . . $\epsilon_{xPki}$ $\epsilon_{yPki}$ $\epsilon_{zPki}$] obtained by varying the influence parameters as described later on. Still in block 150, each vector $r_i$ is then added to vector $u_c$ to obtain a perturbed-coordinate vector $v_{Ci}$=[$x_{P1i}$ $y_{P1i}$ $z_{P1i}$ . . . $x_{Pki}$ $y_{Pki}$ $z_{Pki}$] defining the i-th row of a perturbed-coordinate matrix $V_c$. The set of coordinates ($x_{P1i}$, $y_{P1i}$, $z_{P1i}$; . . . ; $x_{Pki}$, $y_{Pki}$, $z_{Pki}$) associated with each perturbed-coordinate vector $v_{Ci}$ relates to a set of points ($P_{li}$, . . . , $P_{ki}$) in appropriate neighborhoods of the corresponding points ($P_1$, . . . , $P_k$).

Block 150 is followed by a block 160, which sets to 1 the value of a simulation cycle counter, which, for the sake of simplicity, is indicated using the same index i as before.

The following blocks 170–210 provide for performing said N number of processing cycles, in each of which, a respective perturbed-coordinate vector $v_c$ is processed. In the following description, reference is made to the i-th processing cycle for processing perturbed-coordinate vector $v_{Ci}$.

In block 170, the compensating unit is enabled to correct the perturbed coordinates ($x_{P1i}$, $y_{P1i}$, $z_{P1i}$, ..., $x_{Pki}$, $y_{Pki}$, $z_{Pki}$) to eliminate the systematic errors of CMM 1, and so obtain at the output of block 170 a compensated-perturbed-coordinate vector $v'_{ci}=[x'_{P1i}\ y'_{P1i}\ z'_{P1i}\ ...\ x'_{PKi}\ y'_{PKi}\ z'_{PKi}]$.

The next block 180 interpolates the points corresponding to the compensated perturbed coordinates ($x'_{P1i}\ y'_{P1i}\ z'_{P1i}\ ...\ x'_{Pki}\ y'_{Pki}\ z'_{Pki}$) to obtain a set of simulated results $Res_i = (g_{li}, ..., g_{ri})$ of the required quantities.

The next block 190 calculates the difference between the values in the Ref set and the corresponding values in the $Res_i$ set to obtain a set of deviations $S_i=(S_{li}, ..., S_{ri})$. The elements in the set of deviations $S_i$ define the i-th row of a deviation matrix S, which, by the end of the simulation cycles, is of size N×r.

The next block 200 increases the value of counter i by one unit.

Block 200 is followed by a block 210, in which the value of counter i is compared with the predetermined N number of cycles. If i<N (fewer than the predetermined number of cycles), block 210 goes back to block 170 to commence another simulation cycle. Conversely, if i is not less than N (predetermined number of cycles reached), block 210 goes on to a final block 220, in which deviation matrix S is processed statistically by means of a matrix algorithm, which multiplies matrix S by its transpose and divides the whole by N to obtain a result covariance matrix $M_{COV}$, in which the diagonal contains the variance values of the required quantities, and the other positions the covariance values relating the quantities in pairs. Measuring uncertainty is worked out directly from the variance and covariance values.

Figure 3:
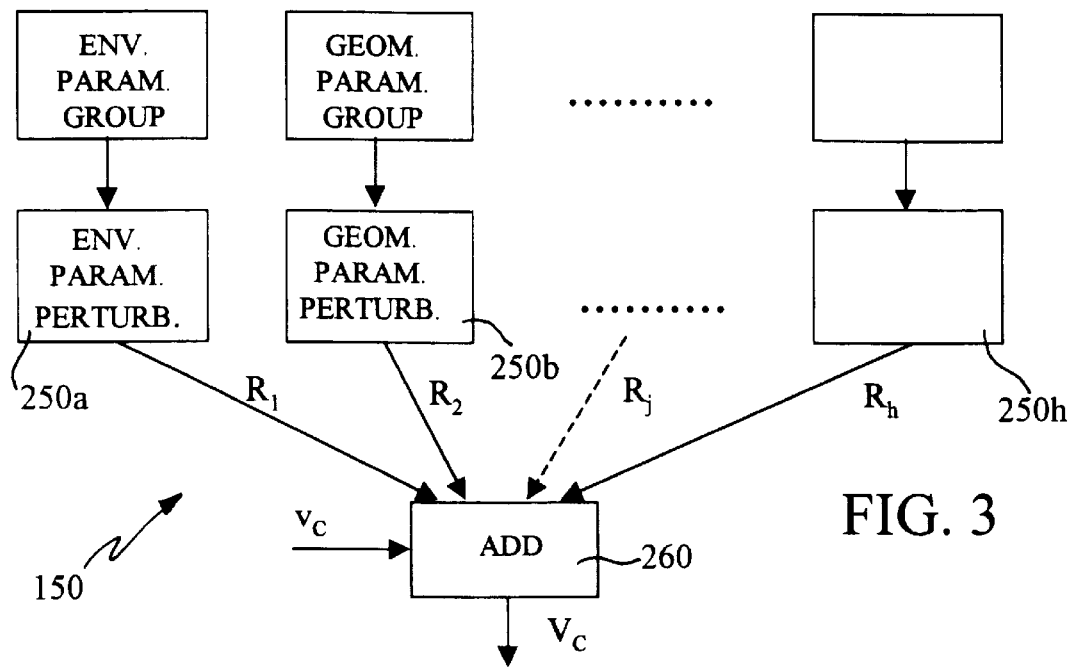

FIG. 3 shows the steps in the method according to the invention for obtaining perturbed-coordinate matrix $V_c$ as described with reference to block 150 in FIG. 2. More specifically, operation of block 150 corresponds to the simultaneous operation of h blocks 250a, 250b, ..., 250h, where h represents the number of functional groups of parameters defined in block 100 (environment parameter group, geometric parameter group, etc.); and each j-th block 250j generates—as described later on with reference to FIG. 4—a corresponding partial-statistical-perturbation matrix $R_j=[\epsilon_{xP1j}\ \epsilon_{yP1j}\ \epsilon_{zP1j}\ ...\ \epsilon_{xPkj}\ \epsilon_{yPkj}\ \epsilon_{zPkj}]$ (in which each of the elements shown is a column vector of size N) by statistically varying the elements in the j-th functional group of parameters, and the meaning of which will be made clear later on.

The next block 260 adds matrixes $R_j$ to obtain statistical-perturbation matrix R (introduced with reference to block 150), each vector $r_i$ of which is in turn added, as stated, to measured-coordinate vector $u_c$ to obtain perturbed-coordinate matrix $V_c$.

Figure 4:
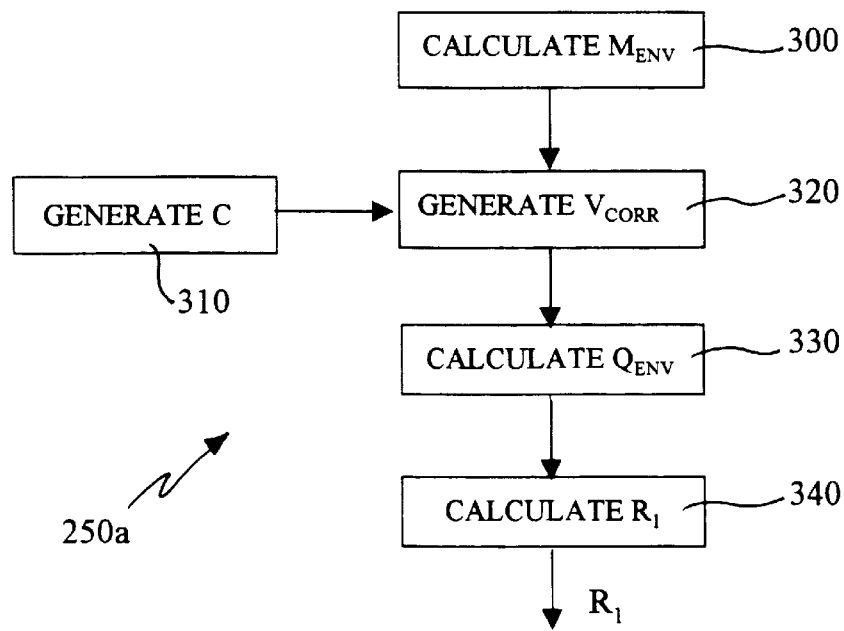

FIG. 4 shows the steps in the generation of partial-statistical-perturbation matrix $R_j$ in each j-th block 250j.

For the sake of simplicity, only block 250a relative to environment parameters (i.e. only j=1) will be considered, though the same obviously also applies to blocks 250b, ..., 250h.

A block 300 forms an environment parameter covariance matrix $M_{env}$ relative to the elements of an environment parameter vector $V_{env}$ defined by the user when entering the measurement. Vector $V_{env}$ comprises any independent environment parameters (i.e. not dependent on other variables) as well as a certain number of independent subparameters on which the other environment parameters depend. Environment parameter covariance matrix $M_{env}$ is a square matrix of a size (number of rows or columns) equal to the n number of independent environment variables and subvariables, with parameter/subparameter variance values along the main diagonal, and the covariance values of pairs of parameters/subparameters in the other positions. To calculate the variance and covariance values, the variation ranges (introduced in block 110) and probability distributions of the parameters and subparameters of vector $V_{env}$ must obviously be known.

Block 300 is performed simultaneously with a block 310, in which a known random-number generator (not shown) in processing unit 9 generates a random-number matrix C of size N×n and comprising N vectors of random numbers $c_i$ of size n. Each random number has a random value ranging between 0 to 1 and unrelated to the values of the other numbers.

Blocks 300 and 310 are followed by a block 320, in which random-number matrix C is combined, by means of an appropriate known matrix algorithm, with environment parameter covariance matrix $M_{env}$ to obtain a correlated-environment-parameter-value matrix $V_{corr}$ (of size N×n) comprising N vectors $v_{corr,i}$. Despite the random influence of matrix C, the new parameter/subparameter values in matrix $V_{corr}$ take into account the parameter/subparameter probability distributions and variation ranges.

The next block 330 works out—from the subparameter values of correlated-environment-parameter-value matrix $V_{corr}$ and by means of the equation relating the subparameters to the corresponding dependent parameters—the dependent parameter values to obtain an environment parameter matrix $Q_{env}$ in which the values associated with the environment parameters are correlated to the particular combination of random numbers generated in block 310.

Block 330 is followed by a block 340, which, from the environment parameters calculated in block 330, and using a mathematical model relating the point coordinate values to the environment parameter values, calculates a partial-statistical-perturbation matrix $R_1$ (partial in the sense of relating to only one of the influence parameter groups). Matrix $R_1$ is combined in block 260 with the partial-statistical-perturbation matrixes $R_2$, ..., $R_h$ calculated in blocks 250b, ..., 250h to generate perturbed-coordinate matrix $V_c$.

To better understand the method according to the invention, a simple non-limiting application will now be described by way of example.

Figure 5:
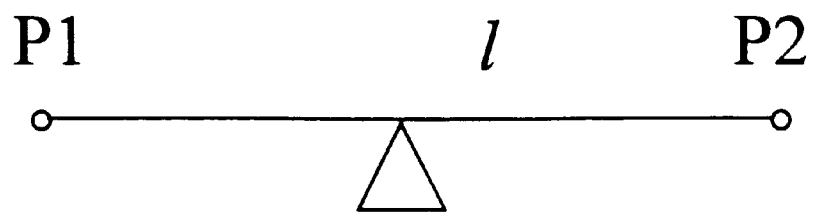
FIG. 5 shows an example application of the method according to the present invention.

To determine, for example, by means of CMM 1, the standard uncertainty u(l) in the measurement of length l of a rod fixed at the mid-point and having two end points P1 and P2 (FIG. 5).

All the parameters thought to influence the measurement are entered in block 100.

The next block 110 performs a real measurement to determine the coordinates ($x_{P1}$, $y_{P1}$, $z_{P1}$) and ($x_{P2}$, $y_{P2}$, $z_{P2}$) of the two end points P1 and P2; and the measured values are compared with the various scales and dimensioned in block 120, and compensated by zero values in block 130.

In the next block 140, CMM 1 calculates length l by means of interpolation algorithm $l=\sqrt{(x_{P1}-x_{P2})^2+(y_{P1}-y_{P2})^2+(z_{P1}-z_{P2})^2}$; and the resulting l value defines reference value Ref.

Block 150 then generates the perturbed-coordinate matrix:

$$V_C = \begin{bmatrix} x_{P11} & y_{P11} & z_{P11} & x_{P21} & y_{P21} & z_{P21} \\ x_{P12} & y_{P12} & z_{P12} & x_{P22} & y_{P22} & z_{P22} \\ \cdots & & & & & \cdots \\ x_{P1N} & x_{P1N} & z_{P1N} & x_{P2N} & y_{P2N} & z_{P2N} \end{bmatrix}$$

Counter i is then set (block 160) and simulation cycle 170–210 commenced. In the generic i-th cycle, block 170 performs the compensation algorithm to obtain the compensated perturbed coordinates ($x'_{P1i}$, $y'_{P1i}$, $z'_{P1i}$, $x'_{P2i}$, $y'_{P2i}$, $z'_{P2i}$) from the perturbed coordinates ($x_{P1i}$, $y_{P1i}$, $z_{P1i}$, $x_{P2i}$, $y_{P2i}$, $z_{P2i}$).

In the next block 180, the interpolation algorithm is applied to the compensated perturbed coordinates ($x'_{P1i}$, $y'_{P1i}$, $z'_{P1i}$, $x'_{P2i}$, $y'_{P2i}$, $z'_{P2i}$) to obtain a value defining an i-th result $Res_i$. The $Res_i$ value is subtracted from the Ref value (block 190) to obtain the i-th value of deviation $S_i$, and the value of counter i is updated one unit (block 200).

The operations in blocks 170–210 are performed a number of times equal to the set number N to complete deviation matrix S, at which point, the condition in block 210 (i<N) is no longer met and block 210 goes on to final block 220.

Block 220 calculates the covariance matrix $M_{COV}$ of the results, which, in the example shown, only comprises the variance of length l; and uncertainty u(l) is determined by calculating the square root of the variance of length l.

For a clearer understanding of the operations performed in block 150, again with reference to the above example, only the contribution of environment parameters, i.e. the contribution of block 250a in FIG. 3, will be considered.

Let it be assumed, for example, that environment effects can be described given only the time and space patterns of the temperatures of the three scales (along the three Cartesian axes x, y, z) and of part 2, their coefficients of thermal expansion, and the restraint condition at the point in which part 2 is bracketed to bed 3; that the restraint condition is expressed by an analytical relationship between the coordinates of the two points $\phi=(x_{p1}, y_{p1}, z_{P1}, x_{P2}, y_{P2}, z_{P2})$; that the scale temperatures $T_X$, $T_Y$, $T_Y$ are equal ($T_X=T_Y=T_Z=T_{scales}$) are constant within the measuring volume, vary sinusoidally in time, and therefore conform with an equation of the type $T_{scales}=f_{scales}(t, A, \phi, \omega)$; that the part temperature varies linearly in time according to the equation $T_{part}=f_{part}(t, m, p)$ and is constant within the volume of the part itself; that the expansion coefficients of the scales are equal and constant in time and space $\alpha_x=\alpha_y=\alpha_z=\alpha_{scale}=K_{SC}$; and that the coefficient of thermal expansion of the part is constant in time and space $\alpha_{part}=K_p$.

Given the above assumptions, the vector of the independent parmeters/subparameters describing the environment effects is: $V_{env}=[A\ \phi\ \omega\ m\ p\ K_{SC}\ K_p]$. Of all these parameters, the variation ranges and probability distributions of the values, and therefore the variances, are known. Let also be assumed that all the patameters, with the exception of A and m, are unrelated, i.e. that only cov (A, m) is other than zero.

Given the above information, block 300 in FIG. 4 calculates environment parameter covariance matrix $M_{env}$.

$$M_{env} = \begin{bmatrix} \sigma^2(A) & 0 & 0 & cov(A,m) & 0 & 0 & 0 \\ 0 & \sigma^2(\varphi) & 0 & 0 & 0 & 0 & 0 \\ 0 & 0 & \sigma^2(\omega) & 0 & 0 & 0 & 0 \\ cov(A,m) & 0 & 0 & \sigma^2(m) & 0 & 0 & 0 \\ 0 & 0 & 0 & 0 & \sigma^2(p) & 0 & 0 \\ 0 & 0 & 0 & 0 & 0 & \sigma^2(K_{sc}) & 0 \\ 0 & 0 & 0 & 0 & 0 & 0 & \sigma^2(K_p) \end{bmatrix}$$

At the time, in block 310, the random-number generator generates matrix C of unrelated random numbers.

Block 320 receives covariance matrix $M_{env}$ and random-number matrix C, and, by means of a matrix transformation, generates a matrix of correlated environment parameter values:

$$V_{corr} = \begin{bmatrix} A_1 & \varphi_1 & \omega_1 & m_1 & p_1 & K_{sc1} & K_{p1} \\ A_2 & \varphi_2 & \omega_2 & m_2 & p_2 & K_{sc2} & K_{p2} \\ \cdots & & & & & & \cdots \\ A_N & \varphi_N & \omega_N & m_N & p_N & K_{scN} & K_{pN} \end{bmatrix}$$

Block 330 uses matrix $V_{corr}$ to reconstruct the new environment-parameter matrix: $Q_{env}=[f_{scale}(t,A,\phi,\omega)\ f_{part}(t, m, p)\ K_{SC}\ K_p]$ (in which each element is a column vector of size N).

In block 340, the new environment-parameter matrix $Q_{env}$ is used to calculate, by means of an appropriate function, the partial-statistical-perturbation matrix $R_1=g(Q_{env})=[\epsilon_{xP11}\ \epsilon_{yP11}\ \epsilon_{zP11}\ \cdots\ \epsilon_{xP21}\ \epsilon_{yP21}\ \epsilon_{zP21}]$ (in which each element is a column vector of size N). The partial statistical perturbations define the coordinate ($x_{P1}$, $y_{p1}$, $z_{P1}$, $x_{P2}$, $y_{P2}$, $z_{P2}$) perturbations generated by variations in environment parameters, taking into account the physical constraint that the bracketing point undergoes no displacement.

The method according to the invention affords the following advantages.

The method is of general application, in the sense of being applied to measurements of any degree of complexity, which means special software modules need not be developed for each type of measurement.

Execution is extremely rapid and provides an uncertainty estimate practically in real time with the CMM measurement, thus reducing the time taken to produce the finished product.

The method according to the invention also provides for accurately determining measuring uncertainty with no need for further measurements of the part.

Carefully separating the effect of errors depending exclusively on the CMM (geometric errors, hysteresis, anisotropy of the tracer, etc.) from that of environment-dependent errors (mainly thermal expansion and deformation) provides for distinguishing uncertainty intrinsic to the machine from that of environmental origin.

Clearly, changes may be made to the measuring method as described and illustrated herein without, however, departing from the scope of the present invention.

What is claimed is:

1. A method of determining the measuring uncertainty of a coordinate measuring machine, said machine comprising a tracer (7) for sampling the surface of a part (2) for measurement, to determine locations of points on the surface of the part (2) and to permit the measurement of geometric quantities ($G_1, \ldots, G_r$) related to the coordinates of said points ($P1, \ldots, Pk$); characterized by comprising the steps of:

measuring (110), by means of said tracer (7), the coordinates of a predetermined number of points ($P1, \ldots, Pk$) on the surface of said part (2) to obtain a set of measured coordinates ($x_{P1}, y_{P1}, z_{P1}; \ldots; x_{Pk}, y_{Pk}, z_{Pk}$);

calculating (140), on the basis of said measured coordinates ($x_{P1}, y_{P1}, z_{P1}; \ldots; x_{Pk}, y_{Pk}, z_{Pk}$), a set of reference values (Ref) for said geometric quantities ($G_1, \ldots, G_r$);

generating (150) a perturbed-coordinate matrix ($V_c$) comprising a predetermined number (N) of rows, each of said rows being defined by a set of perturbed coordinates ($V_{ci}$), and said perturbed coordinates having values statistically close to those of said measured coordinates;

and by also comprising the performance of simulated measuring cycles (170–210), each of which comprises the steps of:

calculating (180), for each set of perturbed coordinates ($V_{ci}$), a set of simulated values ($Res_i$) for said geometric quantities ($G_1, \ldots, G_r$);

calculating (190) the difference between said reference values (Ref) and said simulated values ($Res_i$) to obtain a set of deviation values ($S_i$);

and by also comprising the final step (220) of performing a statistical analysis of said sets of deviation values ($S_i$) to determine said measuring uncertainty.

2. A method as claimed in claim 1, characterized in that said measuring uncertainty is related to the presence of influence quantities describable by means of mathematical models including parameters, the uncertainty-affected values of which may be set and/or measured; said step of generating (150) a perturbed-coordinate matrix ($V_C$) comprising the steps of:

generating (320, 300, 310) a correlated-parameter-value matrix ($V_{corr}$) comprising a number of rows equal to said predetermined number (N), each of said rows being defined by a set of correlated parameter values ($V_{corr,i}$) obtained by varying said parameters statistically with a predetermined probability distribution and in a predetermined variation range;

calculating (340), on the basis of a mathematical equation relating said coordinates to said parameters, and on the basis of said correlated-parameter-value matrix ($V_{corr}$), a statistical-perturbation matrix (R) having a number of rows equal to said predetermined number (N), each of said rows being defined by a statistical-perturbation vector ($r_i$) of said coordinates;

adding (260) each said statistical-perturbation vector ($r_i$) of said statistical-perturbation matrix (R) to a measured-coordinate vector ($u_c$) having said measured coordinates as elements, to obtain said perturbed-coordinate matrix ($V_c$).

3. A method as claimed in claim 2, characterized in that the entered and/or measured said measuring parameters are divided into functional groups; the steps of generating (320, 300, 310) a correlated-parameter-value matrix ($V_{corr}$) and calculating (340) a statistical-perturbation matrix (R) of said coordinates being performed for each said functional group; said step of adding (260) each said statistical-perturbation vector ($r_i$) of said statistical-perturbation matrix (R) to a measured-coordinate vector ($u_c$) being performed simultaneously for all said functional groups.

4. A method as claimed in claim 3, characterized in that said step of generating (320) a correlated-parameter-value matrix ($V_{corr}$) comprises, for each said functional group of parameters, the steps of:

generating (310) a random-number matrix (C) having a number of rows equal to said predetermined number (N), each of said rows comprising a number of elements equal to the number of said parameters;

calculating (300), on the basis of estimated and measured values of said parameters, a covariance matrix ($M_{env}$) of said parameters, having the variances associated with said parameters along the main diagonal, and the covariances relating pairs of said parameters in the remaining positions; and combining (320) said random-number matrix (C) with said covariance matrix ($M_{env}$) by means of a predetermined matrix operation to obtain said correlated-parameter-value matrix ($V_{corr}$).

5. A method as claimed in claim 2, characterized in that said sets of simulated values ($Res_i$) are generated, by means of Monte Carlo simulation cycles, statistically varying said parameters.

6. A method as claimed in claim 1, characterized in that said final step (210) of performing a statistical analysis of said sets of deviation values ($S_i$) to obtain said measuring uncertainty comprises the step of calculating, from said sets of deviation values ($S_i$), a covariance matrix ($M_{cov}$) of said quantities, having the variances associated with said quantities along the main diagonal, and the covariances relative to pairs of quantities in the remaining positions.

7. A method as claimed in claim 1, characterized by comprising the step of performing (170), in each said cycle and prior to said step of calculating (180) said set of simulated values ($Res_i$), a compensation operation on said perturbed coordinates ($V_{ci}$) to eliminate systematic errors of said coordinate measuring machine.

8. A method as claimed in claim 1, characterized by being performable either on-line during measuring, or off-line when programming and designing the measuring procedure.

* * * * *

UNITED STATES PATENT AND TRADEMARK OFFICE
CERTIFICATE OF CORRECTION

PATENT NO. : 6,178,389 B1
DATED : January 23, 2001
INVENTOR(S) : Domenico Sola et al.

It is certified that error appears in the above-identified patent and that said Letters Patent is hereby corrected as shown below:

Title page
Item [73], the second Assignee's name should read "Consiglio Nazionale Delle Ricerche.

Signed and Sealed this

Fifth Day of February, 2002

Attest:

Attesting Officer

JAMES E. ROGAN
*Director of the United States Patent and Trademark Office*